United States Patent [19]
Bridegum et al.

[11] 3,783,690
[45] Jan. 8, 1974

[54] LEVEL INDICATOR FOR WATER TANK OF RECREATIONAL VEHICLE

[76] Inventors: James Earl Bridegum, 12143 Gothic Ave., Granada Hills, Calif. 91344; Rudy A. Laczkovich, 1343 Carmelena St., West Los Angeles, Calif. 90025

[22] Filed: Feb. 11, 1972

[21] Appl. No.: 225,482

[52] U.S. Cl. ........................ 73/328, 73/323, 285/62
[51] Int. Cl. ............................................ G01f 23/02
[58] Field of Search ..................... 73/328, 329, 325, 73/326, 323, 332; 285/62; 248/57

[56] References Cited
UNITED STATES PATENTS

| | | | |
|---|---|---|---|
| 2,847,856 | 8/1958 | Mahon | 73/325 |
| 2,916,916 | 12/1959 | Holsclaw | 73/323 X |
| 1,524,760 | 2/1925 | Sway | 285/62 X |
| 2,628,799 | 2/1953 | Aaby | 248/57 |
| 3,183,716 | 5/1965 | Lyon | 73/323 |
| 3,212,335 | 10/1965 | Guiffre | 73/328 |
| 1,286,046 | 11/1918 | Marks | 73/325 X |
| 1,583,000 | 5/1926 | Maynard | 285/62 |

FOREIGN PATENTS OR APPLICATIONS

| 977,900 | 12/1964 | Great Britain ...................... 73/325 |
|---|---|---|

*Primary Examiner*—Richard C. Queisser
*Assistant Examiner*—Daniel M. Yasich
*Attorney*—Pastoriza & Kelly

[57] ABSTRACT

A flow tube arranged in fluid communication with a remotely located water storage tank is coupled to a convenient fixture inside a recreational vehicle.

A transparent part of the tube is stably held against the fixture by a retaining means. In order to indicate the water level of the tank, a floatation marker is located within the tube for viewing by a person.

11 Claims, 3 Drawing Figures

PATENTED JAN 8 1974
3,783,690
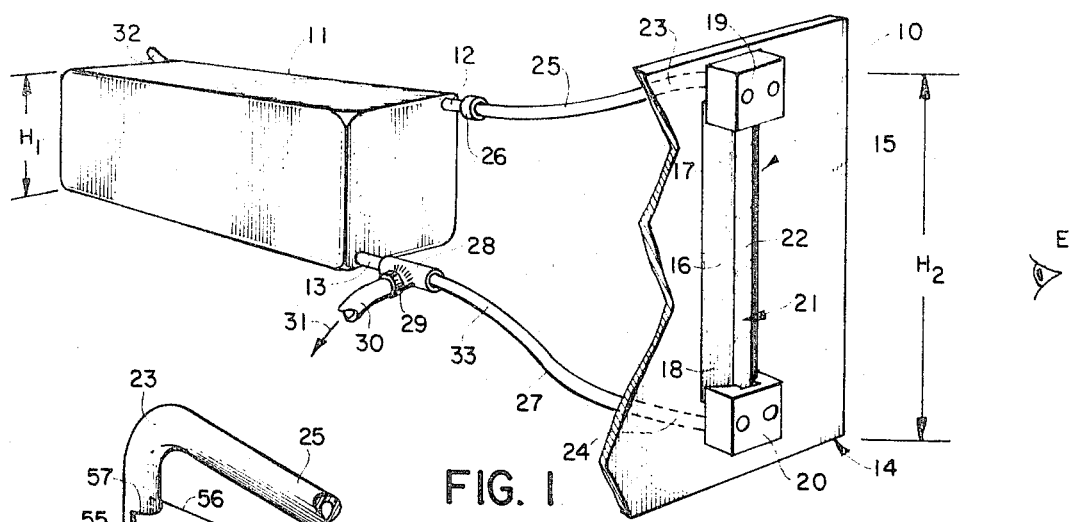
FIG. 1
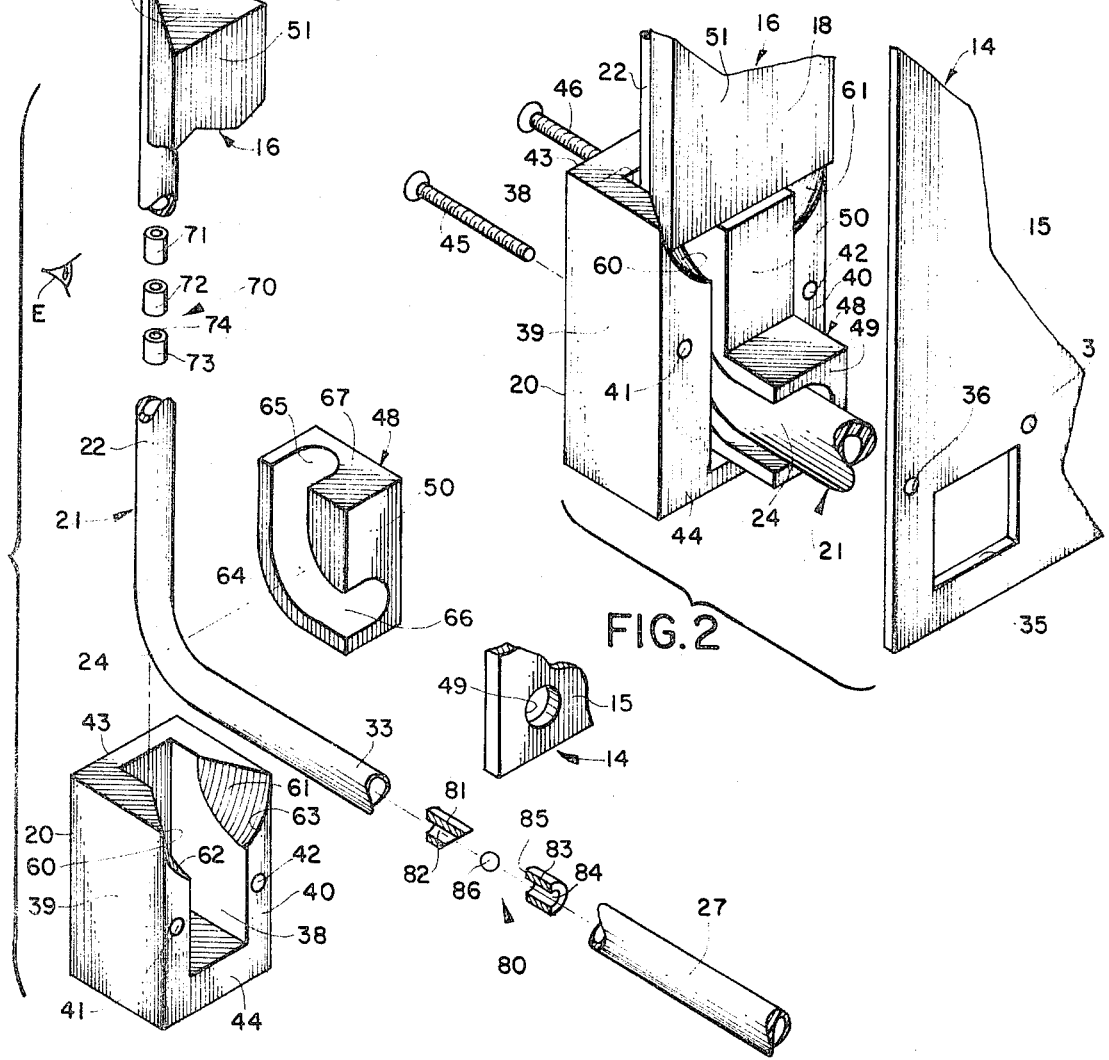
FIG. 2
FIG. 3

LEVEL INDICATOR FOR WATER TANK OF RECREATIONAL VEHICLE

BACKGROUND OF THE INVENTION

This invention generally relates to recreational vehicle equipment and more specifically to an accessory for use in connection with the water tank of conventional recreational vehicles such as campers, trailers, motor homes and the like. The accessory may be included as original equipment or installed subsequently by the vehicle owner.

Modern recreational vehicles are customarily equipped with a water storage tank and usually a heating unit for heating the water. It is important to know the approximate quantity of water in a tank so that plans for its allocation and/or replenishment can be made. If only a slight amount of water is left then it should be used carefully to avoid serious problems or at least inconvenience.

To assist in determining the amount of water remaining some tanks have water level indicators, usually including an electrical or electronic water level gauge unit. These units are relatively expensive, complex, prone to malfunctioning due to corrosion and other reasons, present electrical wiring problems, and, must be switched off to avoid draining away of electrical current in the associated battery.

Unless the electrical or electronic level gauge units are included as original equipment, they are very troublesome to install in the water storage tanks which must be cut to mount the unit and operatively position some of its components. Tank wall linings and insulation layers often become excessively ripped and possibly destroyed unless utmost care is taken. Tap and welding fittings must be carefully and accurately positioned to accept the electrical components and on some code approved tanks it is improper to alter the tanks.

To overcome these problems the water level indicator of this invention is basically mechanical and stably mounted in a remote location from the water tank at a handy position where it is visible and may be easily observed and read by a person.

SUMMARY OF THE INVENTION

Briefly stated this invention comprehends an inexpensive, easily installed, level indicator for use in association with the water tank of a recreational vehicle.

A recreational vehicle fixture has a mounting portion with lower and upper openings vertically spaced by distance approximately equal to the height of a conventional water storage tank located in the recreational vehicle.

A flow tube is arranged in fluid communication with the tank and has a lower bend tubular segment aligned through the lower opening of the fixture mounting portion, an upper bend tubular segment aligned through the upper opening of the fixture mounting portion and a transparent intermediate tubular segment between the bend tubular segments. A sight indicator is located within the transparent intermediate tubular segment in order to indicate the water level of the tank.

In order to retain the transparent intermediate tubular segment in a stable position against the fixture mounting portion, a holding plate is provided that includes a longitudinal seating recess for holding the major portion of the intermediate tubular segment. Lower and upper mounting blocks secure the ends of the holding plate against the fixture mounting portion. Preferably the mounting blocks have insert spaces for receiving and partially covering corresponding ends of the holding plate.

Coupled to the lower and upper mounting blocks are lower and upper bending plates which engage and shape the lower and upper bend tubular segments. The bending plates have grooves that partially fit around and confine their respective bend tubular segments.

The mounting blocks have cavities which partially confine the bending plates. The bending plates may be formed with rearwardly extending and generally concealed positioning lugs that project through corresponding openings of the fixture mounting portion.

The sight indicator includes three tubular floatation markers. The uppermost marker and the lowermost marker are sized so that they are incapable of passing entirely through the upper bend tubular segment and lower bend tubular segment respectively.

A check valve assembly is located in the flow tube between the tank and lower bend tubular segment for preventing water in the intermediate tubular segment from being emptied due to sudden suction pressure from a demand pump.

BRIEF DESCRIPTION OF THE DRAWINGS

The numerous benefits and unique aspects of the present invention will be fully understood when the following detailed description is studied in conjunction with the drawings in which:

FIG. 1 is a perspective, partially sectional view showing a level indicator constructed in accordance with this invention being used in conjunction with a water storage tank of a recreational vehicle;

FIG. 2 is a perspective, fragmentary, partially exploded view of the lower section of the level indicator; and FIG. 3 is a perspective, exploded view showing further details of some important components of the level indicator and a different embodiment of the bending plate.

DETAILED DESCRIPTION OF THE PREFERRED EMBODIMENT

Referring primarily to FIG. 1 a level indicator 10 is shown arranged for operation in connection with a heavy duty water storage tank 11 mounted at a customary location inside a conventional recreational vehicle.

The tank 11 has an upper corner port 12, a lower corner port 13 and an overall height $H_1$.

Located to one side of tank 11 is a fixture 14 of the recreational vehicle which, for purposes of example, may be a wall or panel. The fixture has a mounting portion 15 formed with upper and lower openings.

The level indicator 10 includes an elongated holding plate 16 which is formed along its outermost section with a seating recess. The upper end 17 of holding plate 16 is held against mounting portion 15 by way of an upper mounting block 19. Similarly the lower end 18 of holding plate 16 is held against the mounting portion 15 by way of an identically constructed lower mounting block 20. The mounting blocks overlap the extreme portions of the holding plate ends and bind plate 16 against the fixture mounting portion 15.

A flow tube 21 aligned in fluid communication with water storage tank 11 has a transparent intermediate tubular segment 22 extending between mounting blocks 19 and 20. An upper bend tubular segment 23 extends through an upper opening of the fixture mounting portion 15 and a lower bend tubular segment 24 extends through a lower opening of the fixture mounting portion 15. An upper tubular segment 25 is coupled to corner port 12 of tank 11 by way of a collar 26. A lower tubular segment 27 is secured by a T-joint coupling 28 to corner port 13. A branch 29 of T-joint coupling 28 places the water in tank 11 in communication with a utility line 30 that leads to various fixtures within the recreational vehicle such as sinks, showers, toilets, etc. The directional arrow 31 indicates how the water flows to ultimate use locations within the recreational vehicle.

The tank has an inlet 32 by which the tank 11 may be replenished with water. Between the T-joint coupling 28 and lower bend tubular segment 24 is a check valve zone 33 that shall be more fully explained. The level indicator 10 would be viewed from the side of fixture 14 as indicated by eye symbol E.

Referring primarily to FIG. 2, the mounting portion 15 of fixture 14 has a lower opening 35 and an upper opening (not shown) identical with the opening 35. Positioned slightly above and on opposing sides of opening 35 is a pair of fastener apertures 36 and 37 for admitting bolts, screws or the like. The lower mounting block 20 has a hollow section or cavity 38 and a pair of side walls 39 and 40. Extending through the side walls 39 and 40 are elongated fastener holes 41 and 42 aligned in registration with fastener apertures 36 and 37. To install lower mounting block 20 against fixture mounting portion 15 a pair of elongated bolts 45 and 46 are extended through corresponding fastener holes 41 and 42 and registering fastener apertures 36 and 37.

Lower mounting block 20 has a front wall 43 which, when installed for operation, would be exposed to generally face the point from which a person would be generally expected to view the level indicator 10. An end wall 44 is aligned substantially perpendicular with front wall 43.

Positioned partially within the cavity 38 is a lower bending plate 48 having a rearwardly extending portion constituting a positioning lug 49. When bending plate 48 is confined by mounting block 20 then its positioning lug 49 becomes located in the lower opening 35 of the fixture mounting portion 15. A bearing surface 50 adjacent the positioning lug 49 is generally aligned in co-planar relationship with a concealed flat base 51 of the holding plate 16. When the level indicator 10 is fully installed the holding plate flat base 51 bears against the fixture mounting portion 15 along its entire length. The bearing surface 50 and a corresponding bearing surface of an upper bending plate are forced by their respective mounting blocks to bear against segments of the fixture mounting portion 15. Inasmuch as the openings of the fixture mounting portion 15 are identical, the mounting blocks are identical and the bending plates are identical, a thorough description of one item of each pair will suffice for a full understanding.

FIG. 3 indicates that holding plate 16 is generally triangular in cross section, has a pair of sloped sidewalls 55 and 56 converging from flat base 51 and includes an elongated seating recess 57 which extends from end-to-end. The seating recess 57 is shaped and sized for receiving and snugly retaining the transparent intermediate tubular segment 22 of flow tube 21. Segment 22 may be sized to snap or slide fit into seating recess 57. Preferably the flow tube 21 is entirely transparent from end to end.

The upper end of mounting block 20 is formed with a pair of insert spaces 60 and 61 for receiving and partially covering the lower end 18 of holding plate 16. The upper mounting block 19 is similarly formed with insert spaces to assist in securely retaining and positioning the upper end of holding plate 16. The insert spaces 61 and 62 define shoulders 62 and 63 respectively for engaging the lower end 18 of holding plate 16.

Bending plate 48 has a bending groove 64 which is convex and generally semi-circular in cross section and defines an axis that turns through an angle of approximately 90° from one end 65 to the opposite end 66. The radius of bending groove 64 is slightly larger than the radius of flow tube 21 so that the lower bend tubular segment 24 can be snugly retained without buckling or becoming constricted. Bending plate 48 is formed with a stop wall 67 which engages and butts against the lower end 18 of holding plate 16.

Positioned inside the flow tube 21 between the bending plates is a visual indicator 70 constituted by three floatation markers constructed from any suitable material of less density than water such as polypropylene. The upper floatation marker 71, the intermediate floatation marker 72 and the lower floatation marker 73 have central apertures 74 that serve as flow passages. The markers are preferably colored red or some other bright color. While one marker would be sufficient under most circumstances three are employed as a precautionary measure to eliminate the need of possible repairs and maintenance that would arise in the event that a marker became lodged in bend tubular segments 23 and 24.

If for example, after considerable usage of the level indicator 10, the upper marker 71 became lodged in the upper bend tubular segment 23 and the lower marker 73 also became stuck in the lower bend tubular segment 24, then the intermediate marker 72 would still be free to float within the tube 22 in order to indicate the tank water level.

Under ordinary circumstances the three markers 71, 72 and 73 would float together in stacked relationship. If the upper marker 71 and lower marker 73 became jammed and their respective tube corners water would still flow relatively unimpeded because, as previously indicated, the central apertures 74 of the markers would serve as flow passages.

The upper markers 71 and lower markers 73 are fabricated sufficiently long relative to the radiuses of their respective bend tubular segments to assure that they would become stuck and not passed through. By way of example, if the bend radius of the tubular segments was eleven-sixteenths inches then the length of the upper and lower markers would be equal to or greater than three-eighth inches.

Demand pumps are used in connection with most water storage tanks of recreational vehicles. The pump operates to apply sudden and intense suction through the tank discharge port in response to a person twisting a faucet handle, pushing a flow button or the like. The suction pressure quickly draws water from the tank, through the flow distribution branches and to the particular outlet such as a sink, shower, toilet facility, etc. Under some circumstances the suction pressure would tend to empty the column of water contained within intermediate tubular segment 22 of the flow tube 21. To guard against this situation a special check valve assembly 80 is positioned between lower bend tubular segment 24 and the tank 11 at check valve zone 33.

The check valve assembly 80 has three components, i.e.; a tubular plug 81 with a central opening 82 and a truncated end generally facing the tank 11, a tubular valve seat 83 with a central opening 84 and having a seat rim 85, and, a ball valve 86 interposed between tubular plug 81 and valve seat 83. The ball valve 86 is permitted to travel back and forth between tubular plug 81 and tubular valve seat 83. It may totally block passage 84 but is incapable of ever totally blocking passage 82 because of the truncated shape. Therefore water from the tank 11 is never prevented from flowing through the check valve zone 33, around lower bend tubular segment 24 and upwardly into the intermediate tubular segment 22. However, when a demand pump becomes activated water within the intermediate tubular segment 22 is prevented from becoming exhausted and discharted into the flow system because ball valve 86 will become seated against valve seat rim 85 to block the passage of water.

For purposes of illustration the level indicator 10 has been shown as incorporating a lower mounting block and bending plate assembly and an upper mounting block and bending plate assembly. This arrangement would be used whether the heavy duty water storage tank 11 was a pressure tank or nonpressurized tank. If the tank is pressurized then it is necessary for upper tubular segments 25 to link tank 11 with intermediate tubular segment 22. Many tanks are nonpressurized in which situation the upper tubular segment 25 would be simply clamped off at a point concealed from view behind fixture 14.

The embodiment of bending plate 48 is significantly different in one major respect from that shown in FIG. 2. Mainly there is no positioning lug or projection and the bearing surface 50 is planar from the stop wall 67 to the opposite end. No part of bending plate 48 is structured to project through the opening 49 of the fixture mounting portion. The opening 49 is shown as circular in cross section and may be oval or of various irregular shapes. The bearing surface 50, in this simplified version of bending plate 48, merely lies flush against the fixture 14 with only the flow tube 21 extending through opening 49.

The movable valve 86 of the check valve assembly 80 could be an object with a flat seat rather than a ball. Also instead of the floatation markers 71, 72 and 73 being tubular they could have an oval or other irregular cross section so that water could always be by-passed along at least one side.

Demand pumps referred to above are only used in connection with nonpressurized tanks and therefore the check valve assembly 80 would not be necessary in cases where pressure tank systems are present in the recreational vehicles.

OPERATION

Keeping the above construction in mind it can be understood how the previously described disadvantages of conventional level indicator units are overcome or substantially eliminated by the present invention.

The level indicator 10 could be installed as original equipment by the manufacturer or, alternatively, easily installed subsequently by the recreational vehicle owner or an automotive supply company, etc.

One of many possible assembly sequences will be described. The height $H_1$ of the water storage tank 11 is measured and then a suitable erect fixture 14 inside the recreational vehicle is selected. The fixture 14 may be a wall, panel, post, partition or the like located at a point somewhat remote from the tank 11 where it would be convenient for a person to visually check from time to time. For example, the distance between the tank 11 and fixture 14 could be two feet.

Rectangular upper opening and lower openings 35 (or irregular openings 49 in the case of the FIG. 3 embodiment) are formed by any convenient method in the fixture mounting portion 15 and care is taken so that the openings are separated by a vertical space $H_2$ that is substantially equivalent with the tank height $H_1$. The holding plate 16 is then cut to a length approximately 2 inches shorter than the tank height $H_1$.

The three markers 71, 72 and 73 are dropped into the flow tube 21 and urged to a point approximately to its center. Upper tubular segment 25 is drawn through the upper opening of the fixture mounting portion 15 and the lower tubular segment 27 is drawn through lower opening 35. Thereafter the upper and lower bending plates are forced over the flow tube 21 to constitute upper bend tubular segment 23 and lower bend tubular segment 24. The holding plate 16 is arranged in place with intermediate tubular segment 22 snap fitted or at least laid in place within the elongated seating recess 57. The mounting blocks 19 and 20 are then urged to partially contain their respective bending plates and corresponding ends of the holding plate 16. The positioning lugs 49 are inserted through the openings of the fixture mounting portion 15 after which bolts 45 and 46 are used to securely connect the level indicator 10 to the fixture 14. In the case of the FIG. 3 embodiment the bearing surfaces 50 are aligned flush against fixture 14.

When water from the tank 11 is allowed to flow into the level indicator it will rise to an equivalent level in intermediate tubular segment 22 and bouy the floatation markers 71, 72 and 73 to a point where a person may easily observe the water level. The lengths of upper marker 71 and lower marker 73 are dimensioned so that they are incapable of passing around the upper bend tubular segment 23 and lower bend tubular segment bend 24 respectively. At least the middle marker 72 will be free at all times to indicate the accurate water level.

From the foregoing it will be evident that the present invention has provided a water level indicator for the water tank of a recreational vehicle in which all of the various advantages are fully realized.

What is claimed is:

1. A level indicator for a water tank of a recreational vehicle, comprising:
 a. a water storage tank having a given height;
 b. a recreational vehicle fixture having a mounting portion with lower and upper openings vertically spaced by a distance approximately equal to the given height of the tank;
 c. a flow tube in fluid communication with the tank and having a lower bend tubular portion aligned through the lower opening of the fixture mounting portion, an upper bend tubular portion aligned through the upper opening of the fixture mounting portion, and, a transparent or translucent intermediate tubular portion between the lower and upper bend tubular portions;

d. a sight indicator in the intermediate tubular portion of the flow tube for indicating the water level of the tank;

e. retaining means to retain the intermediate tubular portion in a stable position against the fixture housing portion, the retaining means comprising;

e.1. a holding plate with a longitudinal seating recess that holds the major portion of the intermediate tubular portion;

e.2. a lower mounting block means securing the lower end of the holding plate to the fixture mounting portion and having an insert space for receiving and partially covering the holding plate lower end and lower bend tubular portion;

e.3. an upper mounting block means securing the upper end of the holding plate to the fixture mounting portion and having an insert space for receiving and partially covering the holding plate upper end and upper bend tubular portion.

2. The structure according to claim 1, including:

lower bending plate means coupled to the lower mounting block means and positioned to engage and shape the lower bend tubular portion therein; and, upper bending plate means coupled to the upper mounting block means and positioned to engage and shape the upper bend tubular portions therein.

3. The structure according to claim 2, wherein;

the bending plate means each having a groove that partially fit around and confine their respective bend tubular portions.

4. The structure according to claim 3, wherein;

the bending plate means has a central axis that turns through angles of approximately 90°.

5. The structure according to claim 2, wherein;

the mounting block means each have a cavity, and, the bending plate means partially confined within the cavities of their respective mounting block means and are formed with rearwardly extending positioning lugs that project through corresponding openings of the fixture mounting portion.

6. The structure according to claim 5, wherein;

the holding plate has a flat base that bears against the fixture mounting portion between these lower and upper openings, and, the bending plate means have flat bearing surfaces adjacent their positioning lugs, the bearing surfaces being aligned generally in coplanar relationship with the holding plate flat base.

7. The structure according to claim 5, wherein;

the mounting block means are formed with elongated fastener holds through their opposing side sections, the fixture mounting portion is formed with fastener apertures adjacent the openings of the fixture mounting portion and which register with corresponding fastener holds, and, bolts are provided to aid in connecting the mounting block means firmly against the fixture mounting portion.

8. The structure according to claim 1, wherein;

the sight indicator includes a floatation marker.

9. The structure according to claim 1, wherein the sight indicator includes:

three tubular floatation markers, the upper most and lower most markers being sized so that they are incapable of passing entirely through the upper ends tubular segment and lower bend tubular portion respectively.

10. The structure according to claim 1, including:

a check valve assembly in the flow tube between the tank and lower bend tubular portion for preventing water in the intermediate tubular portion from emptying in response to suction pressure.

11. The structure according to claim 10, wherein the check valve assembly includes:

a stationary tubular valve seat located closer to the tank;

a stationary tubular plug located closer to the lower bend tubular portion with its end adjacent the tubular valve seat being truncated, and, a ball valve positioned between the tubular valve seat and tubular plug.

* * * * *